(12) United States Patent
Kim et al.

(10) Patent No.: US 11,854,455 B2
(45) Date of Patent: Dec. 26, 2023

(54) TEST DEVICE, DISPLAY DEVICE, AND METHOD OF GENERATING COMPENSATION DATA FOR A DISPLAY DEVICE

(71) Applicant: SAMSUNG DISPLAY CO., LTD., Yongin-si (KR)

(72) Inventors: Kyung-Woo Kim, Yongin-si (KR); Dongjoon Kwag, Yongin-si (KR); Hyunseuk Yoo, Seoul (KR); Seokha Hong, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 6 days.

(21) Appl. No.: 17/326,979

(22) Filed: May 21, 2021

(65) Prior Publication Data
US 2022/0076607 A1    Mar. 10, 2022

(30) Foreign Application Priority Data

Sep. 7, 2020    (KR) .................. 10-2020-0113711

(51) Int. Cl.
*G09G 3/20* (2006.01)
*G06T 7/33* (2017.01)
(Continued)

(52) U.S. Cl.
CPC ......... *G09G 3/2007* (2013.01); *G06T 7/0004* (2013.01); *G06T 7/33* (2017.01);
(Continued)

(58) Field of Classification Search
CPC .. G09G 3/2007; G09G 3/3266; G09G 3/2077; G09G 3/3607; G09G 5/06;
(Continued)

(56) References Cited

U.S. PATENT DOCUMENTS

2004/0252905 A1* 12/2004 Mizes ................ H04N 1/00082
382/254
2008/0260234 A1* 10/2008 Yamashita ............. G06V 10/24
382/144
(Continued)

FOREIGN PATENT DOCUMENTS

| KR | 10-1929001 | 12/2018 |
|---|---|---|
| KR | 10-1953262 | 2/2019 |
| KR | 10-2076042 | 2/2020 |

*Primary Examiner* — Fred Tzeng
(74) *Attorney, Agent, or Firm* — F. Chau & Associates, LLC

(57) ABSTRACT

A method of generating information to control display of images providing a display device with align pattern data to which box data having a maximum reference gray level is added, obtaining a first capture image generated based on the align pattern data to which the box data is added, providing the display device with one or more full pattern data respectively having one or more reference gray levels lower than the maximum reference gray level, and obtaining one or more second capture images generated based on the one or more full pattern data. The method also includes generating compensation data including compensation values at the one or more reference gray levels and the maximum reference gray level. The compensation data may be generated based on the one or more second capture images and a portion of the first capture image corresponding to the box data.

20 Claims, 10 Drawing Sheets

(51) Int. Cl.
*G06T 7/00* (2017.01)
*G09G 3/3266* (2016.01)

(52) U.S. Cl.
CPC .. *G06T 2207/30121* (2013.01); *G09G 3/3266* (2013.01); *G09G 2320/0233* (2013.01); *G09G 2360/145* (2013.01)

(58) Field of Classification Search
CPC ...... G09G 5/24–28; G09G 5/37; G09G 5/373; G09G 5/377; G09G 2320/0204; G09G 2320/0233; G09G 2320/0271; G09G 2320/0285; G09G 2320/0238; G09G 2320/0242; G09G 2320/0276; G09G 2320/029; G09G 2320/0295; G09G 2320/04; G09G 2360/145; G06T 7/33; G06T 7/0004; G06T 2207/30121
See application file for complete search history.

(56) References Cited

U.S. PATENT DOCUMENTS

| | | | |
|---|---|---|---|
| 2009/0214104 A1* | 8/2009 | Sugihara | G06T 7/001 382/209 |
| 2010/0245541 A1* | 9/2010 | Zhao | H04N 13/246 348/45 |
| 2016/0042505 A1* | 2/2016 | Tsuchiya | G06T 7/136 382/144 |
| 2019/0057652 A1* | 2/2019 | Lee | H04N 21/4316 |
| 2021/0058571 A1* | 2/2021 | Shyshkin | H01L 27/14609 |

* cited by examiner

TEST DEVICE, DISPLAY DEVICE, AND METHOD OF GENERATING COMPENSATION DATA FOR A DISPLAY DEVICE

CROSS-REFERENCE TO RELATED APPLICATION(S)

This application claims priority under 35 USC § 119 to Korean Patent Application No. 10-2020-0113711, filed on Sep. 7, 2020, in the Korean Intellectual Property Office (KIPO), the contents of which are herein incorporated by reference in its entirety.

BACKGROUND

1. Field

One or more embodiments described herein relate to a test device, a display device, and a method of generating compensation data for a display device.

2. Description of the Related Art

The processes used to manufacture a display device may cause its pixels to vary in performance. For example, even when the same manufacturing processes are used, the pixels may exhibit non-uniform luminances or mura defects due to process variations. Attempts have been made to compensate for these defects and non-uniformities using inaccurate methods.

SUMMARY

One or more embodiments described herein provide a method of generating accurate compensation data to correct defects and/or non-uniformities in display devices.

One or more other embodiments may provide a test device that generates accurate compensation data to correct defects and/or non-uniformities in display devices.

One or more other embodiments may provide a display device storing accurate compensation data to correct defects and/or non-uniformities in display devices.

In accordance with one or more embodiments, a method of generating information to control display of images includes providing a display device with align pattern data to which box data having a maximum reference gray level is added, obtaining a first capture image of the display device generated based on the align pattern data to which the box data is added, providing the display device with one or more full pattern data respectively having one or more reference gray levels lower than the maximum reference gray level, and obtaining one or more second capture images of the display device generated based on the one or more full pattern data. The method also includes generating compensation data including a plurality of compensation values at the one or more reference gray levels and the maximum reference gray level, the compensation data generated based on the one or more second capture images and a portion of the first capture image corresponding to the box data. The display device is a self-luminous display device.

In accordance with one or more embodiments, a test device includes first logic, a camera, and second logic. The first logic is configured to provide a display device with test data, the test data including align pattern data and one or more full pattern data, the align pattern data including added box data having a maximum reference gray level, and the one or more full pattern data respectively having one or more reference gray levels lower than the maximum reference gray level.

The camera is configured to obtain a first capture image and one or more second capture images of the display device, the first capture image generated based on the align pattern data including the added box data and the one or more second capture images generated based on the one or more full pattern data.

The second logic is configured to generate compensation data including a plurality of compensation values at the one or more reference gray levels and the maximum reference gray level, the plurality of compensation values generated based on the one or more second capture images and a portion of the first capture image corresponding to the box data. The display device is a self-luminous display device.

In accordance with one or more embodiments, a display device includes a display panel, a scan driver, a memory, a controller, and a data driver. The display panel includes a plurality of pixels, each of the plurality of pixels including a self-luminous light emitter. The scan driver is configured to provide scan signals to the plurality of pixels. The memory is configured to store compensation data. The controller is configured to generate corrected image data by correcting input image data based on the compensation data. The data driver is configured to provide data signals to the plurality of pixels based on the corrected image data.

The compensation data includes a plurality of compensation values at a maximum reference gray level, determined based on a first capture image corresponding to align pattern data to which box data having a maximum reference gray level are added, and a plurality of compensation values at one or more reference gray levels, determined based on one or more second capture images corresponding to one or more full pattern data respectively having one or more reference gray levels lower than the maximum reference gray level.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE EMBODIMENTS

Hereinafter, embodiments of the present inventive concept will be explained in detail with reference to the accompanying drawings.

Figure 1:
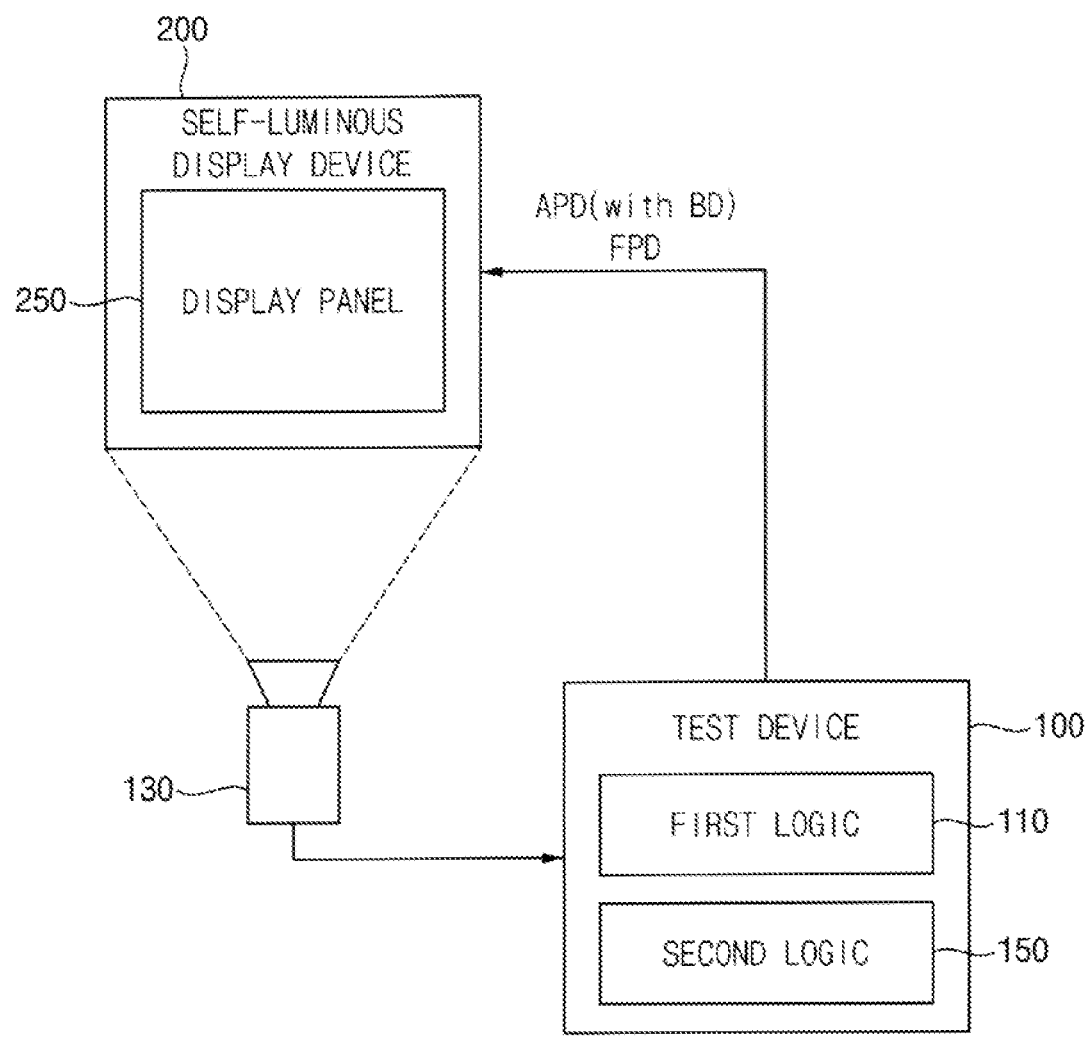
FIG. 1 illustrates an embodiment of a test device for a display device.

FIG. 1 is a block diagram illustrating an embodiment of a test device 100 that generates compensation data for a display device 200. The display device 200 may be a self-luminous display device or another type of display device. Hereinafter, for illustrative purposes, the display device 200 will be discussed as a self-luminous display device.

Referring to FIG. 1, the test device 100 (or test equipment) according to embodiments may generate compensation data for a self-luminous display device 200. In some embodiments, the test device 100 may perform a test process including, for example, mura correction (or a mura correction operation) for the self-luminous display device 200.

The test device 100 may include a test data providing block 110, a camera 130 and a compensation data generating block 150. The test data providing block (e.g., first logic) 110 may provide test data to the self-luminous display device 200, so that the self-luminous display device 200 may display an image corresponding to the test data. In the test device 100 according to embodiments, the test data providing block 110 may provide, to the self-luminous display device 200, align pattern data APD to which box data BD are added and one or more full pattern data FPD.

The align pattern data APD may be data for aligning a position of a display panel 250 of the self-luminous display device 200 and a position of a capture image obtained by the camera 130. In some embodiments, the align pattern data APD may be dot pattern data representing an image including a black background and one white dot per M*M pixels in the black background, where M is an integer greater than 1. For example, the align pattern data APD, or the dot pattern data, may represent one white dot corresponding to one pixel per 40*40 pixels. The align pattern data APD (or dot pattern data) may be configured differently in another embodiment.

The box data BD may have a predetermined (e.g., maximum) reference gray level. In some embodiments, the compensation data may include a plurality of compensation values at a plurality of reference gray levels, and the box data BD may represent a white box image having the maximum reference gray level among the plurality of reference gray levels. For example, the range of gray levels for the self-luminous display device 200 may be 256 gray levels, ranging from a 0-gray level to a 255-gray level. In this case, the plurality of reference gray levels may be, for example, a 31-gray level, a 63-gray level, a 95-gray level, a 127-gray level, a 160-gray level and the 255-gray level, and the maximum reference gray level of the box data BD may be the 255-gray level. The number and levels of the reference gray levels and/or the maximum reference gray level may be different in another embodiment.

In some embodiments, the box data BD may represent one white box image at a predetermined (e.g., a substantially center) position of the display panel 250. In some embodiments, the size of the one white box image may correspond to the size of N*N pixels, where N is an integer greater than 1. For example, the size of the one white box image may correspond to, but is not limited to, the size of 40*40 pixels, the size of 80*80 pixels, or another size. In other embodiments, the box data BD may represent a plurality of white box images located at a plurality of positions of the display panel 250. For example, the plurality of white box images may be, but is not limited to, 3*3 white box images, 5*5 white box images, 7*7 white box images, 9*9 white box images, or white box images of other sizes.

The one or more full pattern data FPD may respectively have one or more reference gray levels lower than the maximum reference gray level. For example, the range of gray levels for the self-luminous display device 200 may be 256 gray levels, ranging from the 0-gray level to the 255-gray level. In this case, the plurality of reference gray levels may be, for example, the 31-gray level, the 63-gray level, the 95-gray level, the 127-gray level, the 160-gray level and the 255-gray level. In this case, the test data providing block 110 may sequentially provide first full pattern data FPD having a first reference gray level of the 31-gray level, second full pattern data FPD having a second reference gray level of the 63-gray level, third full pattern data FPD having a third reference gray level of the 95-gray level, fourth full pattern data FPD having a fourth reference gray level of the 127-gray level, and fifth full pattern data FPD having a fifth reference gray level of the 160-gray level to the self-luminous display device 200.

The camera 130 may capture an image displayed by the self-luminous display device 200 based on the test data. In some embodiments, the camera 130 may be, but is not limited to, a charge coupled device (CCD) camera. Camera 130 may be another type of device in a different embodiment. In the test device 100 according to embodiments, the camera 130 may obtain a first capture image that is displayed by the self-luminous display device 200 based on the align pattern data ALD to which the box data BD are added, and may obtain one or more second capture images that are displayed by the self-luminous display device 200 based on the one or more full pattern data FPD. For example, the camera 130 may obtain the first capture image corresponding to the align pattern data ALD to which the box data BD having the 255-gray level are added, and may obtain five second capture images corresponding to five more full pattern data FPD respectively having the 31-gray level, the 63-gray level, the 95-gray level, the 127-gray level and the 160-gray level.

The compensation data generating block (e.g., second logic) 150 may align the position of the display panel 250 of the self-luminous display device 200 and positions of the one or more second capture images using the first capture image. For example, the size of an image captured by the camera 130 may be greater than a size of the display panel 250. The compensation data generating block 150 may determine the position of a portion of the first capture image corresponding to the display panel 250 by detecting an image corresponding to the align pattern data ALD to which the box data BD are added in the first capture image. Additionally, the compensation data generating block 150 may extract portions of the second capture images corresponding to the display panel 250 according to the determined position and may generate the compensation data based on the extracted portions. In some embodiments, the compensation data generating block 150 may determine the position of each pixel of the display panel 250 in the second capture images using the first capture image.

The compensation data generating block 150 may generate the compensation data, including a plurality of compensation values at the one or more reference gray levels and the maximum reference gray level, based on the one or more second capture images and a portion of the first capture image corresponding to the box data BD. In some embodiments, the compensation data generating block 150 may determine the plurality of compensation values (for a plurality of pixels of the display panel 250) at the one or more reference gray levels based on luminances of the one or more second capture images. For example, the compensation data generating block 150 may determine the compensation value for each pixel at each reference gray level based on the difference between a luminance of the second capture image for the pixel at the reference gray level and a luminance of a target gamma curve at the reference gray level.

In some embodiments, the compensation data generating block 150 may determine the plurality of compensation values for the plurality of pixels at the maximum reference gray level based on a luminance of the portion of the first capture image corresponding to the box data BD. For example, with respect to each pixel within the white box image represented by the box data BD, the compensation data generating block 150 may determine the compensation value for the pixel at the maximum reference gray level based on the difference between a luminance of the first capture image for the pixel and a luminance of the target gamma curve at the maximum reference gray level.

Further, in a case where the box data BD represents the one white box image at the center position, with respect to each pixel outside the one white box image the compensation data generating block 150 may calculate an average compensation value of the plurality of compensation values for the plurality of pixels within the one white box image. Further, the compensation data generating block 150 may determine the compensation value for the pixel outside the one white box image at the maximum reference gray level as the average compensation value.

In some embodiments, in a case where the box data BD represents the plurality of white box images at the plurality of positions, with respect to each pixel outside the plurality of white box images the compensation data generating block 150 may calculate a predetermined number (e.g., four) average compensation values corresponding to the predetermined number (e.g., four) white box images adjacent to the pixel among the plurality of white box images. Further, the compensation data generating block 150 may determine the compensation value for the pixel at the maximum reference gray level by interpolating the four average compensation values.

The test device 100 may write the compensation data (including the plurality of compensation values at the one or more reference gray levels and the maximum reference gray level) to the self-luminous display device 200. For example, the test device 100 may store the compensation data in a compensation data memory of the self-luminous display device 200. When the self-luminous display device 200 operates, the self-luminous display device 200 may generate corrected image data by correcting input image data based on the compensation data stored in the compensation data memory and may drive the display panel 250 based on the corrected image data. Accordingly, the display panel 250 may display an image where a mura defect is eliminated or reduced.

The self-luminous display device 200 may limit a panel current of the display panel 250 to be lower than or equal to a reference current, to reduce power consumption or prevent a burn-in effect from occurring in the self-luminous display device. Thus, a full pattern image having a high gray level higher than a particular gray level (e.g., a 160-gray level) may not be displayed due to the current limit.

In view of the foregoing, if different types of test devices which have been proposed provide full pattern data FPD, having a high gray level (e.g., 255-gray level) higher than the particular gray level, to the self-luminous display device 200, the self-luminous display device 200 may not display a full pattern image corresponding to the high gray level (e.g., the 255-gray level). Instead, the self-luminous display device 200 may display a full pattern image corresponding to the particular gray level (e.g., the 160-gray level).

Accordingly, different types of test devices which have been proposed may not measure or obtain the actual luminance of the display panel 250 at the high gray level higher than the particular gray level, and may predict a luminance at the high gray level by interpolating luminances at gray levels lower than or equal to the particular gray level. The test devices may therefore generate compensation data based on the predicted luminance at the high gray level. In this case, if the self-luminous display device 200 corrects the input image data representing the high gray level in a partial region of the display panel 250 based on the compensation data generated based on the predicted luminance, an image displayed by the display panel 250 may include a mura defect in the partial region corresponding to the high gray level. Thus, different types of test devices which have been proposed may not perform mura correction based on an actually measured luminance at the high gray level.

However, according to one or more embodiments, test device 100 may determine the plurality of compensation values at the one or more reference gray levels using the one or more full pattern data FPD respectively having the one or more reference gray levels lower than the maximum reference gray level. Test device 100 may determine the plurality of compensation values at the maximum reference gray level using the align pattern data APD to which the box data BD having the maximum reference gray level are added, and may generate the compensation data including the plurality of compensation values at the one or more reference gray levels and the maximum reference gray level. Accordingly, actual luminances of the display panel 250 may be measured or obtained, not only at the one or more reference gray levels but also at the maximum reference gray level. Thus, mura correction may be performed based on the actual luminances measured not only at the one or more reference gray levels, but also at the maximum reference gray level.

Figure 2:
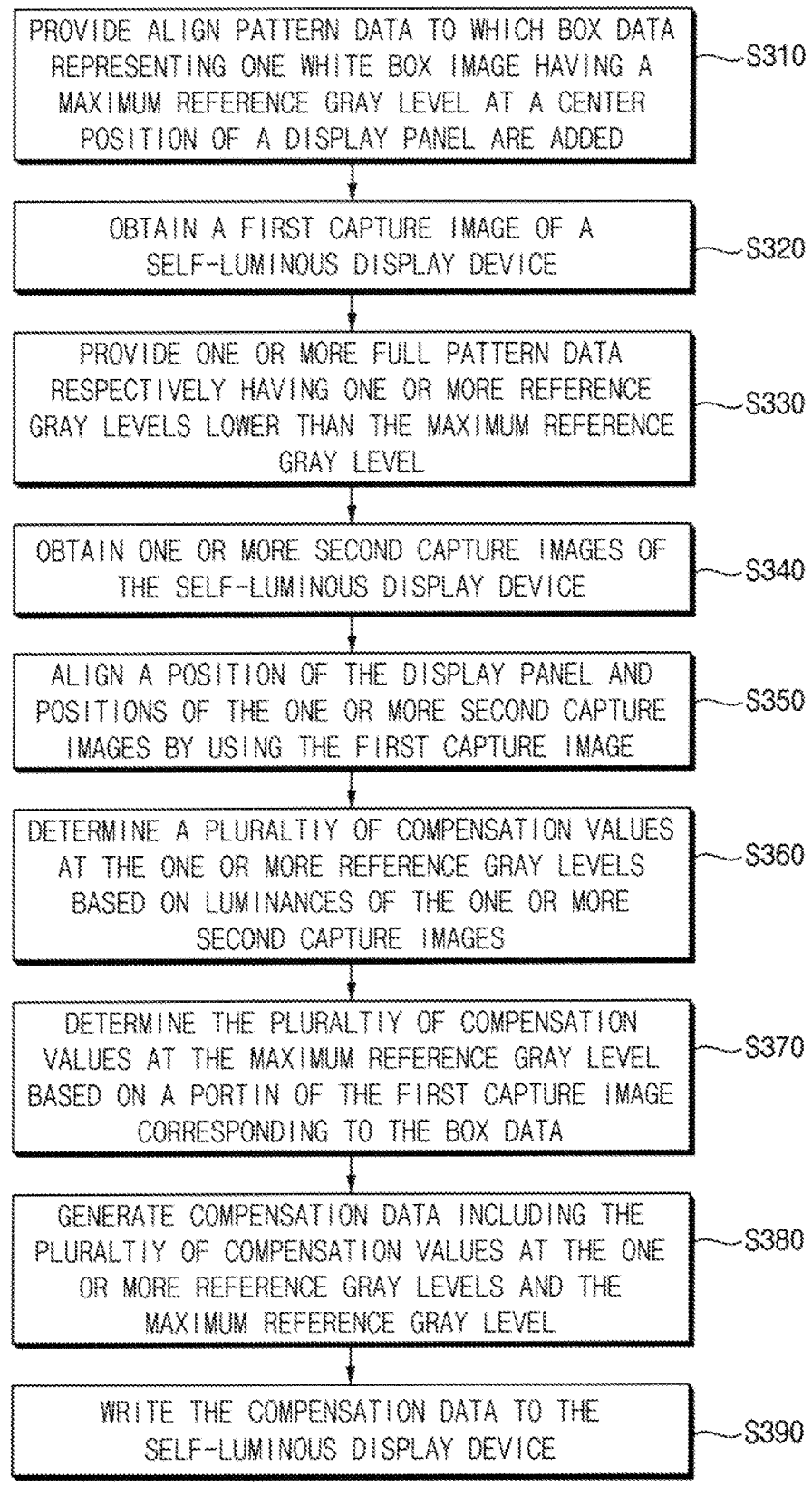
FIG. 2 illustrates an embodiment of a method of generating compensation data for a display device.
Figure 3A:
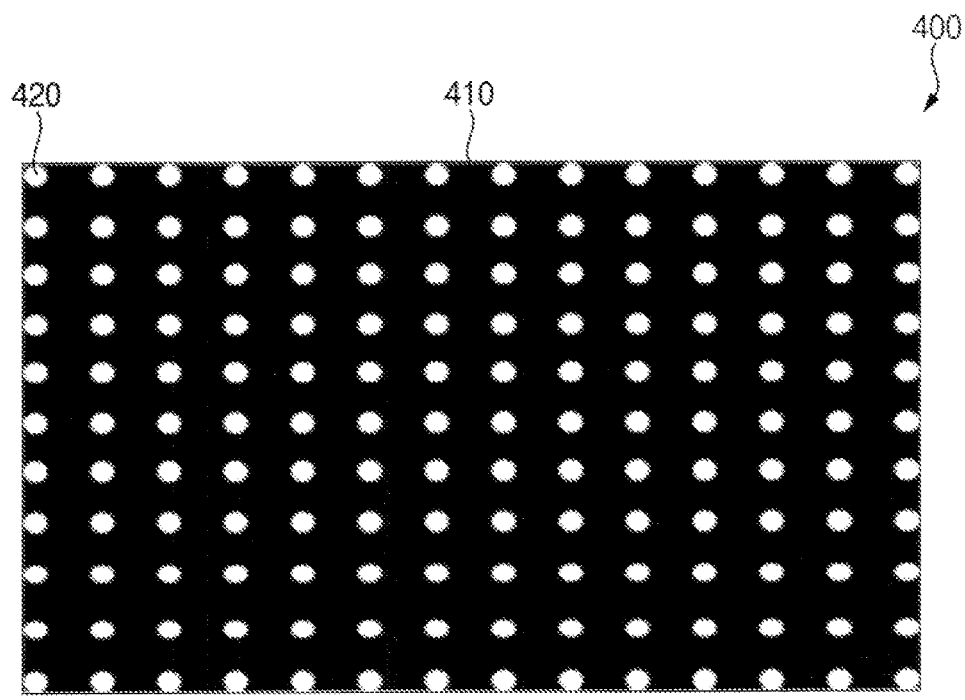
FIG. 3A illustrates an example of align pattern data.
Figure 3B:
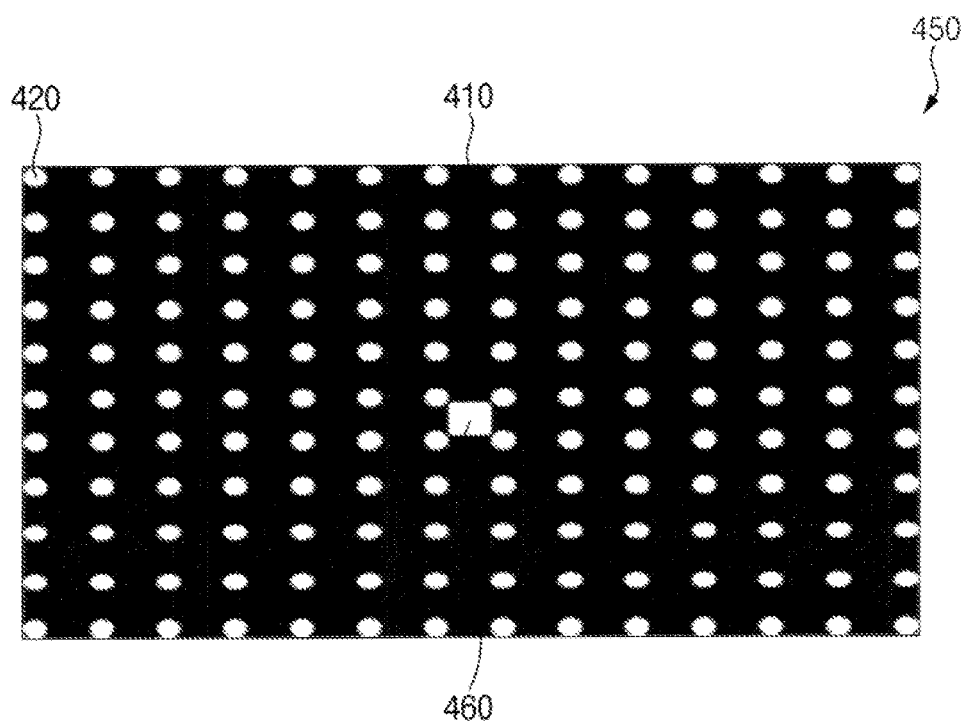
FIG. 3B illustrates an example of align pattern data to which box data are added.
Figure 4:
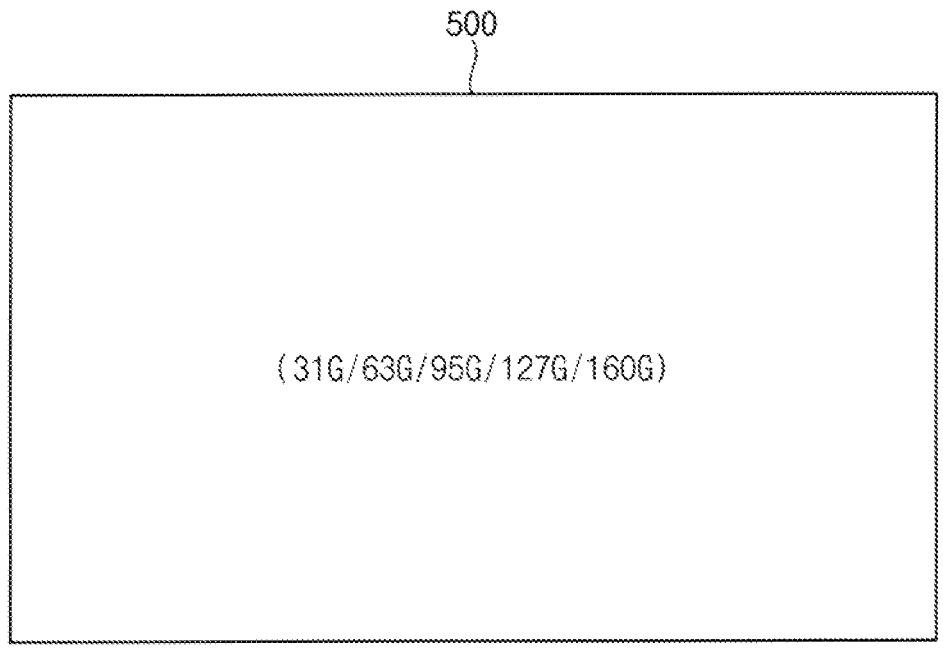
FIG. 4 illustrates an example of full pattern data.
Figure 5:
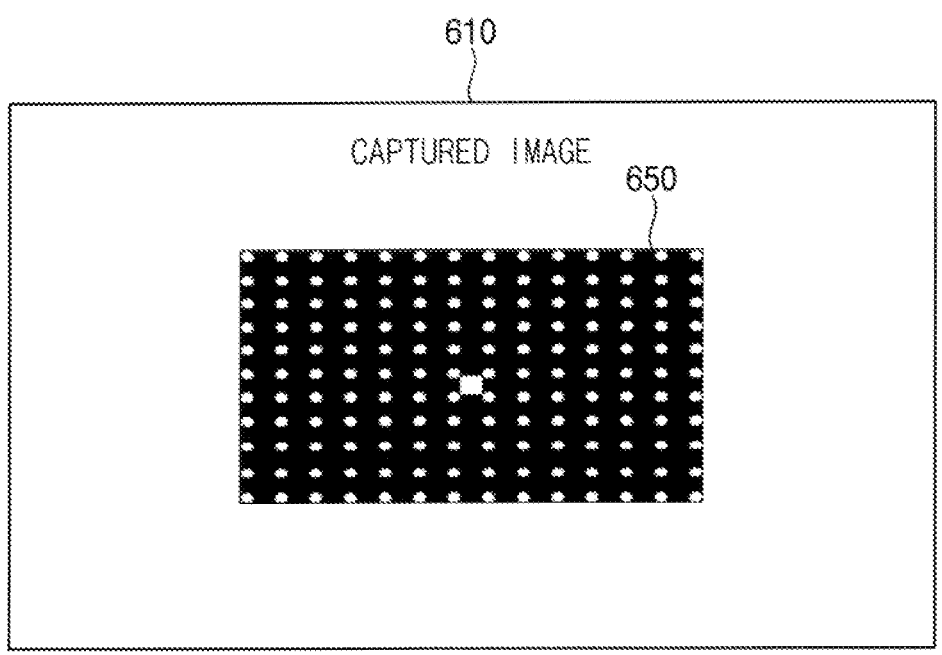
FIG. 5 illustrates an example of aligning a position of a display panel and a position of a second capture image using a first capture image.
Figure 6:
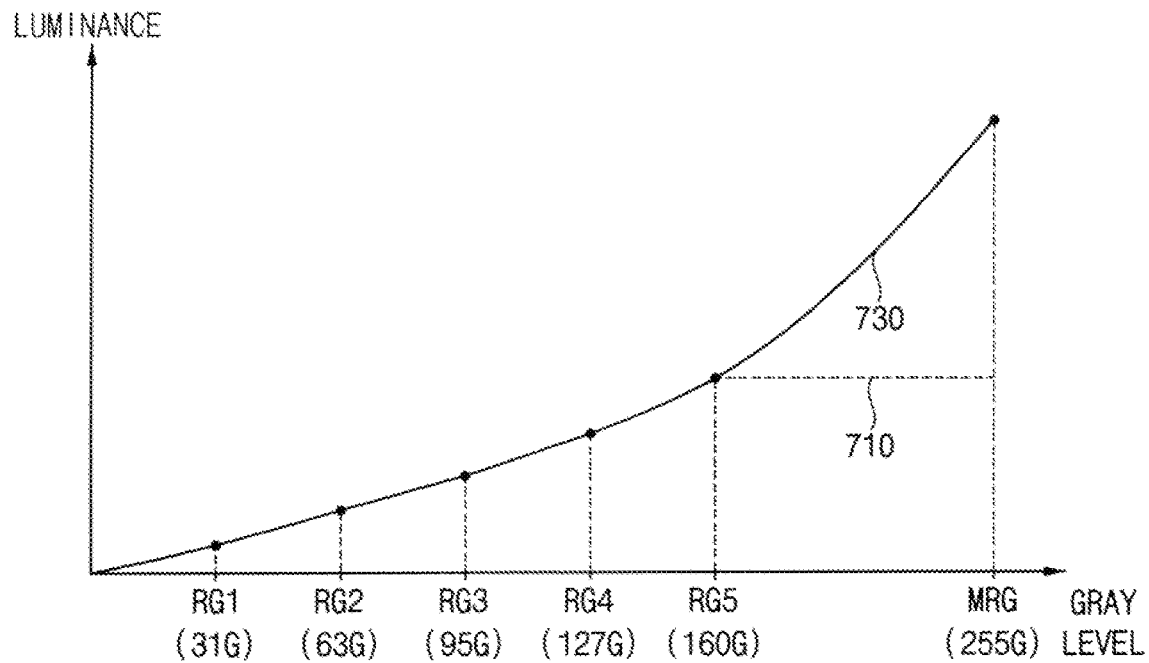
FIG. 6 illustrates an example of a measured luminance curve of a display device.
Figure 7:
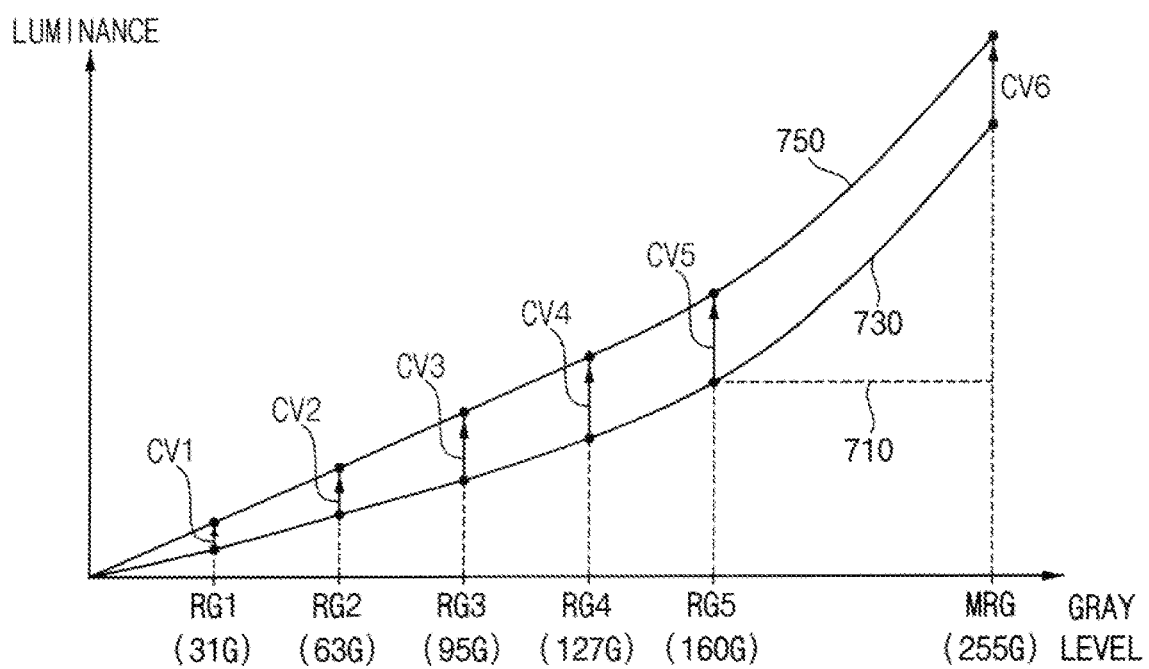
FIG. 7 illustrates an embodiment of determining a plurality of compensation values for each pixel of a display device.

FIG. 2 is a flowchart illustrating an embodiment of a method of generating compensation data for a self-luminous display device. FIG. 3A is a diagram for describing an example of align pattern data, and FIG. 3B is a diagram for describing an example of align pattern data to which box data are added. FIG. 4 is a diagram for describing an example of full pattern data. FIG. 5 is a diagram for describing an example of aligning a position of a display panel and a position of a second capture image by using a first capture image. FIG. 6 is a diagram for describing an example of a measured luminance curve of a self-luminous display device. FIG. 7 is a diagram for describing an example of determining a plurality of compensation values for each pixel of a self-luminous display device.

Referring to FIGS. 1 and 2, according to embodiments the method of generating compensation data for self-luminous display device 200 may perform mura correction for the self-luminous display device 200.

At S310, test device 100 may provide the self-luminous display device 200 with align pattern data APD to which box data BD having a maximum reference gray level are added.

At S320, test device 100 may obtain a first capture image that is displayed by the self-luminous display device 200 based on the align pattern data APD to which the box data BD are added using a camera 130. The align pattern data APD may be data for aligning a position of a display panel 250 of the self-luminous display device 200 and a position of a capture image obtained by the camera 130.

In some embodiments, as illustrated in FIG. 3A, the align pattern data APD may be dot pattern data representing an image 400 including a black background 410 and one white dot 420 per M*M pixels in the black background 410, where M is an integer greater than 1. The dot pattern data may, for example, represent one white dot corresponding to one pixel per 40*40 pixels. The dot pattern data may represent one white dot corresponding to one pixel per another number of pixels (e.g., where M is different from 40) in another embodiment.

In some embodiments, as illustrated in FIG. 3B, the box data BD may represent one white box image 460 having a luminance corresponding to the maximum reference gray level (e.g., a 255-gray level) at a predetermined (e.g., center) position of the display panel 250. Further, in some embodiments, the size of the one white box image 460 may correspond to the size of N*N pixels, where N is an integer greater than 1. For example, the size of the one white box image 460 may correspond to, but is not limited to, the size of 40*40 pixels, the size of 80*80 pixels, or another size. Thus, as illustrated in FIG. 3B, the align pattern data APD to which the box data BD are added may represent an image 450 having one white dot 420 per M*M pixels and having the white box image 460 at the center position.

At S330, the test device 100 may provide the self-luminous display device 200 with one or more full pattern data FPD respectively having one or more reference gray levels lower than the maximum reference gray level.

At S340, the test device 100 may obtain one or more second capture images that are displayed by the self-luminous display device 200 based on the one or more full pattern data FPD using the camera 130. In some embodiments, for example, as illustrated in FIG. 4, each full pattern data FPD may represent a full pattern image 500 with each reference gray level being lower than the maximum reference gray level. Thus, each full pattern data FPD may have the same reference gray level with respect to all or a predetermined number of pixels of the display panel 250.

For example, as illustrated in FIG. 4, the one or more full pattern data FPD may include first full pattern data FPD having a first reference gray level of a 31-gray level 31G, second full pattern data FPD having a second reference gray level of a 63-gray level 63G, third full pattern data FPD having a third reference gray level of a 95-gray level 95G, fourth full pattern data FPD having a fourth reference gray level of a 127-gray level 127G, and fifth full pattern data FPD having a fifth reference gray level of a 160-gray level 160G.

At S350, the test device 100 may align a position of the display panel 250 of the self-luminous display device 200 and positions of the one or more second capture images using the first capture image. For example, as illustrated in FIG. 5, the size of an image 610 captured by the camera 130 may be greater than a size of the display panel 250. The test device 100 may determine a position of a portion of the first capture image corresponding to the display panel 250 by detecting an image 650 corresponding to the align pattern data ALD to which the box data BD are added in the first capture image. In addition, the test device 100 may extract portions of the one or more second capture images corresponding to the display panel 250 according to the determined position of the image 650, and may generate the compensation data based on the extracted portions. Further, in some embodiments, the test device 100 may determine a position of each pixel of the display panel 250 in the one or more second capture images using the first capture image.

In the method of generating the compensation data according to embodiments, the test device 100 may measure or obtain actual luminances of the display panel 250, not only at the one or more reference gray levels but also at the maximum reference gray level. This may be accomplished using not only the one or more second capture images but also a portion of the first capture image corresponding to the box data BD.

For example, as illustrated in FIG. 6, the test device 100 may obtain an actual luminance of the display panel 250 at the first reference gray level RG1 of the 31-gray level 31G, an actual luminance of the display panel 250 at the second reference gray level RG2 of the 63-gray level 63G, an actual luminance of the display panel 250 at the third reference gray level RG3 of the 95-gray level 95G, an actual luminance of the display panel 250 at the fourth reference gray level RG4 of the 127-gray level 127G, an actual luminance of the display panel 250 at the fifth reference gray level RG5 of the 160-gray level 160G, and an actual luminance of the display panel 250 at the maximum reference gray level MRG of the 255-gray level 255G.

Other test devices which have been proposed may not measure or obtain an actual luminance of the display panel 250 at a high gray level higher than a particular gray level (e.g., the 160-gray level 160G). Thus, these other proposed test devices may obtain a luminance curve 710 that has a constant luminance at gray levels higher than the particular gray level. However, in accordance with one or more embodiments, the test device 100 may obtain an actual luminance curve 730 of the display panel 250 at the one or more reference gray levels RG1, RG2, RG3, RG4 and RG5 and the maximum reference gray level MRG.

At S360, in accordance with one or more embodiments, the method may perform mura correction that generates compensation data based on the actual luminance curve 730. For example, the test device 100 may determine a plurality of compensation values for a plurality of pixels of the display panel 250 at the one or more reference gray levels RG1, RG2, RG3, RG4 and RG5 based on luminances of the one or more second capture images.

At S370, the test device 100 may determine the plurality of compensation values for the plurality of pixels at the maximum reference gray level MRG based on a luminance of the portion of the first capture image corresponding to the box data BD.

At S380, the test device 100 may generate the compensation data at the one or more reference gray levels RG1, RG2, RG3, RG4 and RG5 and the maximum reference gray level MRG.

For example, as illustrated in FIG. 7, with respect to each pixel of the display panel 250, the test device 100 may determine the following compensation values: a compensation value CV1 at the first reference gray level RG1 based on a difference between the luminance of the actual luminance curve 730 at the first reference gray level RG1 and the luminance of a target gamma curve 750 at the first reference gray level RG1, the compensation value CV2 at the second reference gray level RG2 based on a difference between the luminance of the actual luminance curve 730 at the second reference gray level RG2 and the luminance of the target gamma curve 750 at the second reference gray level RG2, the compensation value CV3 at the third reference gray level RG3 based on a difference between the luminance of the actual luminance curve 730 at the third reference gray level RG3 and the luminance of the target gamma curve 750 at the third reference gray level RG3, the compensation value CV4 at the fourth reference gray level RG4 based on a difference between the luminance of the actual luminance curve 730 at the fourth reference gray level RG4 and the luminance of the target gamma curve 750 at the fourth reference gray level RG4, and the compensation value CV5 at the fifth reference gray level RG5 based on a difference between the luminance of the actual luminance curve 730 at the fifth reference gray level RG5 and the luminance of the target gamma curve 750 at the fifth reference gray level RG5.

With respect to each pixel within the white box image represented by the box data BD, the test device 100 may determine the compensation value CV6 at the maximum reference gray level MRG based on a difference between the luminance of the actual luminance curve 730 at the maximum reference gray level MRG and the luminance of the target gamma curve 750 at the maximum reference gray level MRG. Further, in some embodiments, with respect to each pixel outside the white box image, the test device 100 may calculate an average compensation value of the plurality of compensation values for the plurality of pixels within the white box image, and may determine the compensation value for the pixel outside the white box image at the maximum reference gray level MRG as the average compensation value.

At S390, the test device 100 may write the compensation data (including the plurality of compensation values at the one or more reference gray levels RG1, RG2, RG3, RG4 and RG5 and the maximum reference gray level MRG) to the self-luminous display device 200. When the self-luminous display device 200 operates, the self-luminous display device 200 may generate corrected image data by correcting input image data based on the compensation data stored in a compensation data memory, and may drive the display panel 250 based on the corrected image data. Accordingly, the display panel 250 may display an image where a mura defect is eliminated or reduced.

As described above, in one or more embodiments of the method of generating the compensation data, the test device 100 may determine a plurality of compensation values at the one or more reference gray levels RG1, RG2, RG3, RG4 and RG5 using the one or more full pattern data FPD, respectively having the one or more reference gray levels RG1, RG2, RG3, RG4 and RG5 lower than the maximum reference gray level MRG. The test device 100 may determine the plurality of compensation values at the maximum reference gray level MRG using the align pattern data APD to which the box data BD having the maximum reference gray level MRG are added. In addition, the test device 100 may generate the compensation data that includes the plurality of compensation values at the one or more reference gray levels RG1, RG2, RG3, RG4 and RG5 and the maximum reference gray level MRG. Accordingly, actual luminances of the display panel 250 may be measured or obtained, not only at the one or more reference gray levels RG1, RG2, RG3, RG4 and RG5 but also at the maximum reference gray level MRG. Therefore, mura correction may be performed based on the actual luminances measured at the one or more reference gray levels RG1, RG2, RG3, RG4 and RG5, as well as at the maximum reference gray level MRG.

Figure 8:
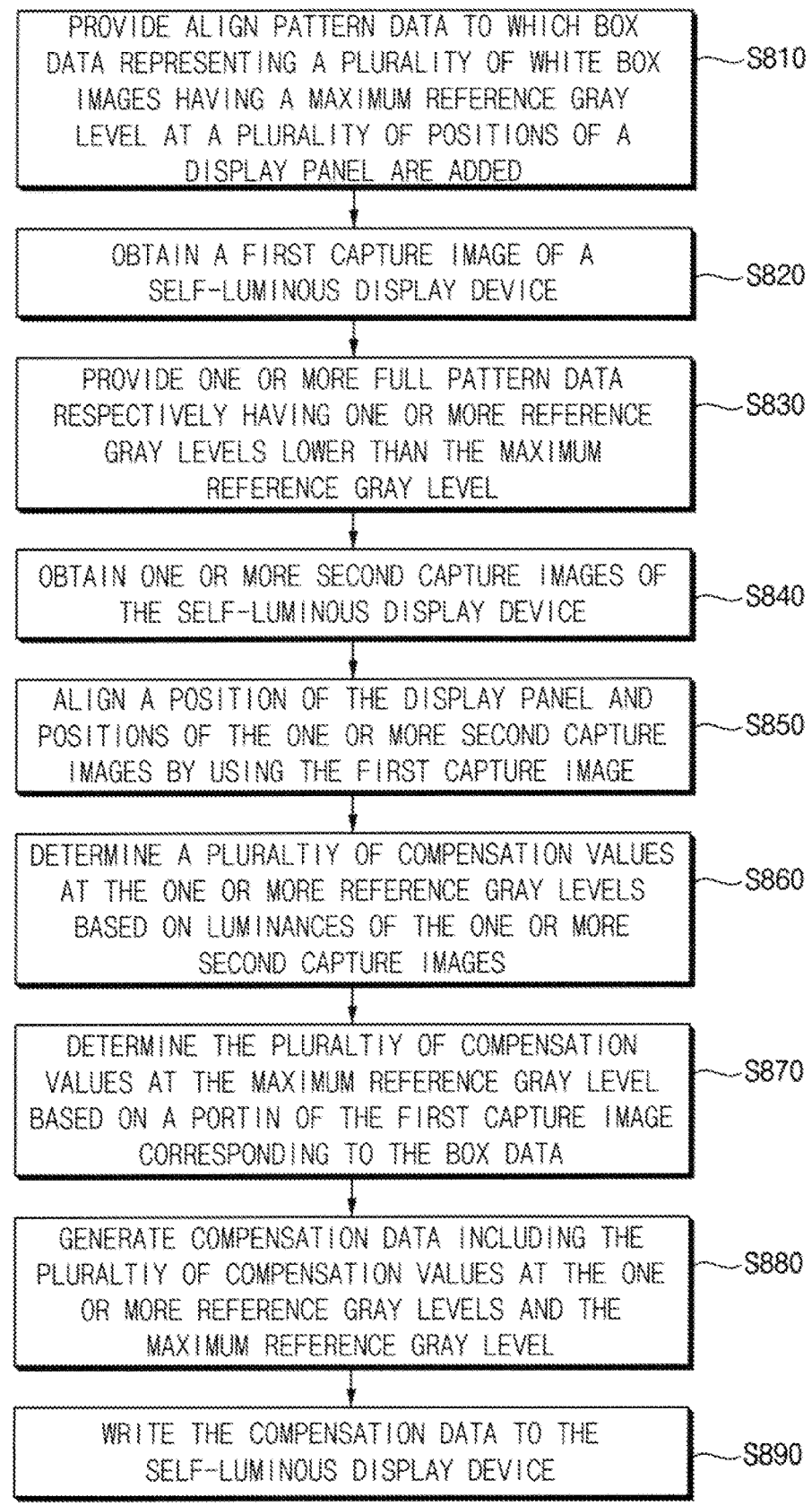
FIG. 8 illustrates an embodiment of a method of generating compensation data for a display device.
Figure 9:
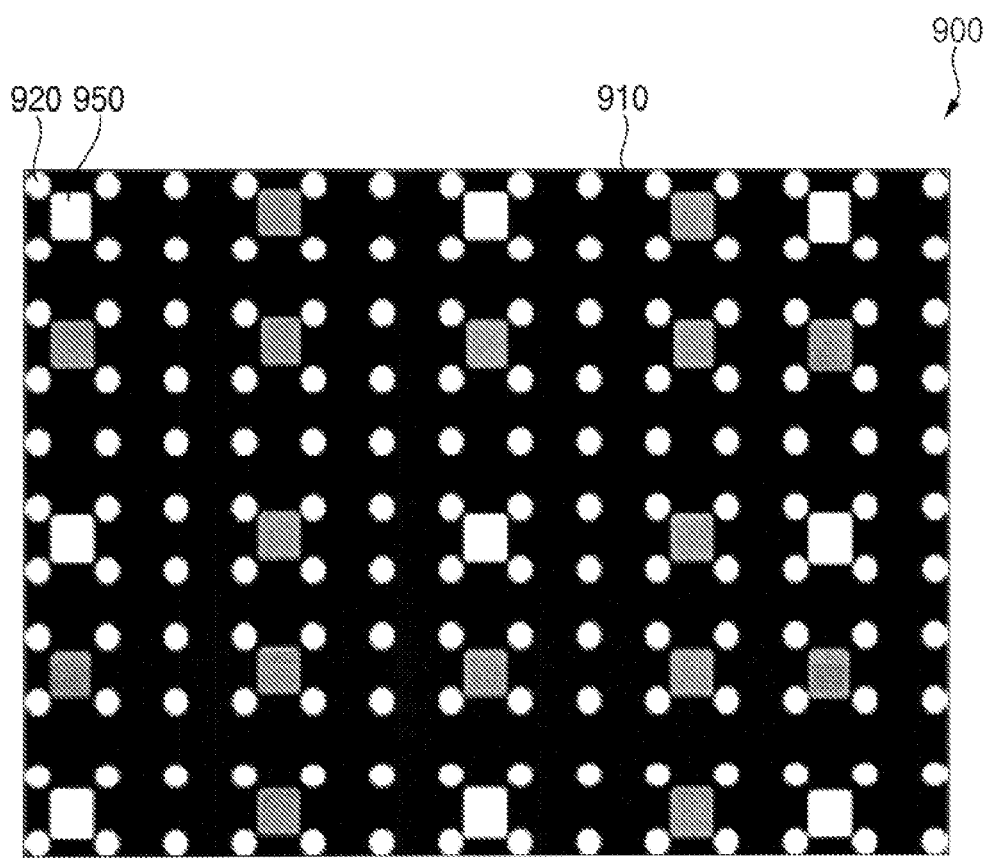
FIG. 9 illustrates an example of align pattern data to which box data are added.
Figure 10:
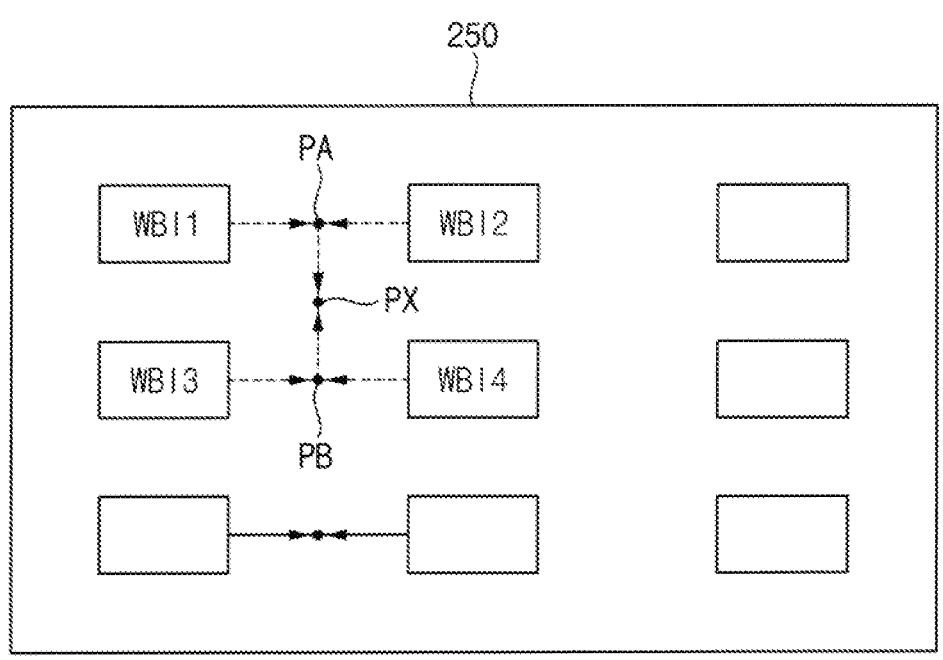
FIG. 10 illustrates an example of determining a plurality of compensation values for one or more pixels at a maximum reference gray level.

FIG. 8 is a flowchart illustrating an embodiment of a method of generating compensation data for a self-luminous display device. FIG. 9 is a diagram describing an example of align pattern data to which box data may be added. FIG. 10 is a diagram describing an example of determining a plurality of compensation values for each pixel at a maximum reference gray level. The method of FIG. 8 may be substantially the same as a method of FIG. 2, except that instead of using box data representing one white box image 460 as illustrated in FIG. 3B, box data representing a plurality of white box images are used at a plurality of positions of a display panel.

Referring to FIGS. 1 and 8, at S810, the test device 100 may provide the self-luminous display device 200 with align pattern data APD to which box data BD having a maximum reference gray level are added.

At S820, the test device 100 may obtain a first capture image that is displayed by the self-luminous display device 200. The first capture image may be obtained based on the align pattern data APD to which the box data BD are added using camera 130.

In some embodiments, the box data BD may represent a plurality of white box images at a plurality of positions of a display panel 250. In some embodiments, the size of each white box image may correspond to a size of N*N pixels, where N is an integer greater than 1. For example, the size of each white box image may correspond to a size of 40*40 pixels, a size of 80*80 pixels, or another size.

As illustrated in FIG. 9, an example of the box data BD represents a plurality of 5*5 white box images 950. Thus, as illustrated in FIG. 9, the align pattern data APD to which the box data BD are added may represent an image 900, which has one white dot 920 per M*M pixels in a black background 910 and which has 5*5 white box images 950 at corresponding 5*5 positions. Although FIG. 9 illustrates an example where the box data BD may represent the 5*5 white box images 950, the number of the white box images 950 represented by the box data BD is not limited to the example of FIG. 9. For example, the box data BD may represent 3*3 white box images, 7*7 white box images, 9*9 white box images, or any other number of white box images.

At S830, the test device 100 may provide the self-luminous display device 200 with one or more full pattern data FPD respectively having one or more reference gray levels lower than the maximum reference gray level.

At S840, the test device 100 may obtain one or more second capture images. The one or more second capture images may be displayed by the self-luminous display device 200 based on the one or more full pattern data FPD using camera 130.

At S850, the test device 100 may align a position of the display panel 250 of the self-luminous display device 200 and positions of the one or more second capture images using the first capture image.

At S860, the test device 100 may determine a plurality of compensation values for a plurality of pixels of the display panel 250 at the one or more reference gray levels. These compensation values may be determined based on luminances of the one or more second capture images.

At S870, the test device 100 may determine the plurality of compensation values for the plurality of pixels at the maximum reference gray level. These compensation values may be determined based on a luminance of a portion of the first capture image corresponding to the box data BD.

In some embodiments, with respect to each pixel within each of the white box images represented by the box data BD, the test device 100 may determine the compensation value at the maximum reference gray level based on a difference between the luminance of the first capture image for the pixel and the luminance of the target gamma curve at the maximum reference gray level.

Further, as illustrated in FIG. 10, with respect to each pixel PX outside the plurality of white box images, the test device 100 may calculate a predetermined number (e.g., four) average compensation values corresponding to the predetermined number (e.g., four) white box images WBI1, WBI2, WBI3 and WBI4 adjacent to the pixel PX among the plurality of white box images.

In addition, the test device 100 may determine the compensation value for the pixel at the maximum reference gray level, for example, by interpolating the four average compensation values. For example, the test device 100 may calculate first through fourth average compensation values corresponding to first through fourth white box images WBI1, WBI2, WBI3 and WBI4 adjacent to the pixel PX. In addition, the test device 100 may calculate a compensation value at a first intermediate position PA by linearly interpolating the first and second average compensation values of the first and second white box images WBI1 and WBI2. In addition, the test device 100 may calculate a compensation value at a second intermediate position PB by linearly interpolating the third and fourth average compensation values of the third and fourth white box images WBI3 and WBI4. In addition, the test device 100 may calculate the compensation value for the pixel PX by linearly interpolating the compensation values at the first and second intermediate positions PA and PB.

At S880, the test device 100 may generate the compensation data at the one or more reference gray levels and the maximum reference gray level.

At S890, the test device 100 may write the compensation data (including the plurality of compensation values at the one or more reference gray levels and the maximum reference gray level) to the self-luminous display device 200. When the self-luminous display device 200 operates, the self-luminous display device 200 may generate corrected image data by correcting input image data based on the compensation data stored in a compensation data memory, and may drive the display panel 250 based on the corrected image data. Accordingly, the display panel 250 may display an image where a mura defect is eliminated or reduced.

As described above, in accordance with one or more embodiments, the method of generating the compensation data may be implemented, in whole or part, using the test device 100. The method may include determining a plurality of compensation values at the one or more reference gray levels using the one or more full pattern data FPD, respectively having the one or more reference gray levels lower than the maximum reference gray level. The method may also include determining the plurality of compensation values at the maximum reference gray level using the align pattern data APD, to which the box data BD having the maximum reference gray level are added. The method may also include generating the compensation data, including the plurality of compensation values at the one or more reference gray levels and the maximum reference gray level. Accordingly, actual luminances of the display panel 250 may be measured or obtained, not only at the one or more reference gray levels but also at the maximum reference gray level. Accordingly, mura correction may be performed based on the actual luminances measured not only at the one or more reference gray levels but also at the maximum reference gray level.

Figure 11:
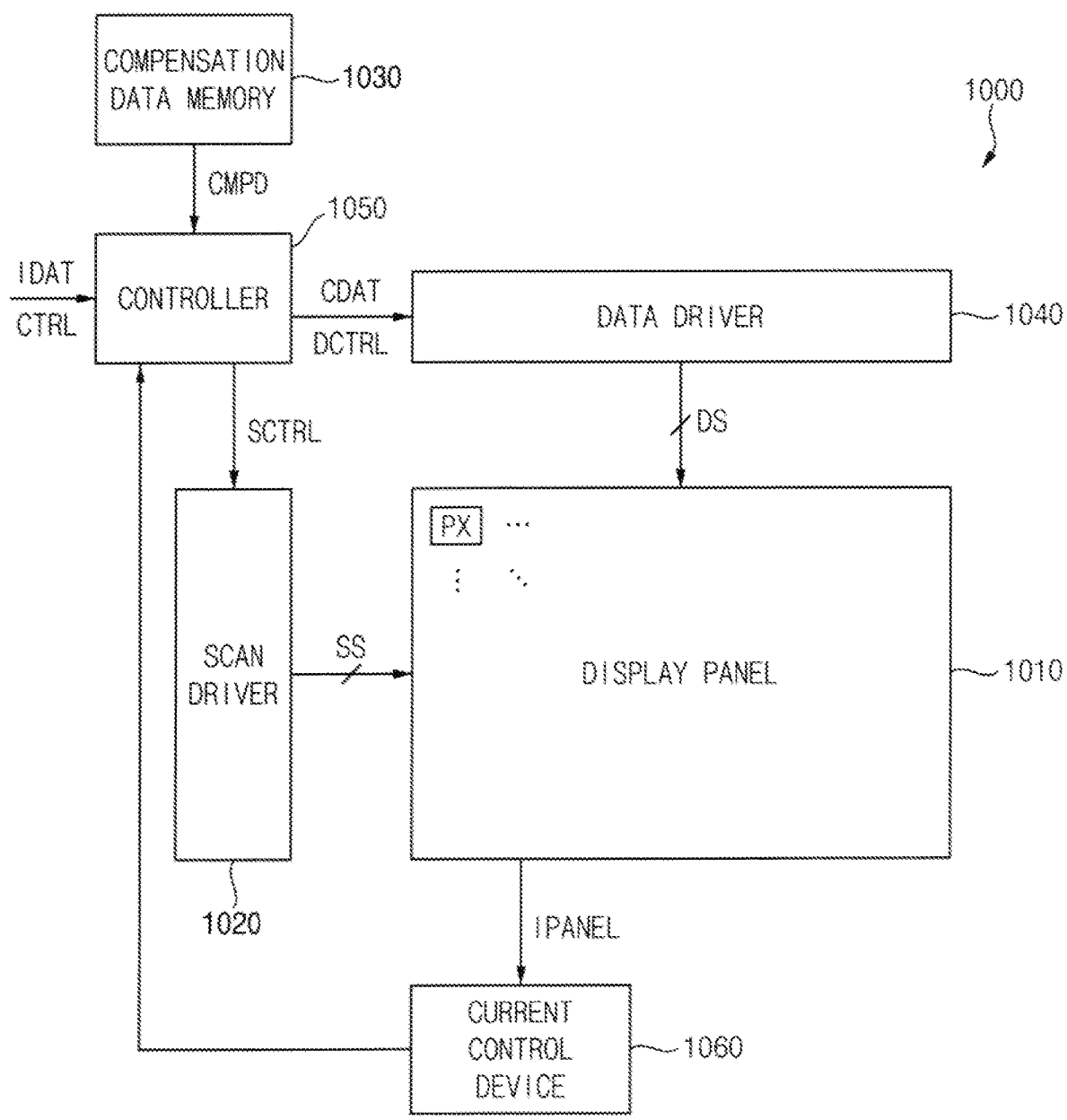
FIG. 11 illustrates an embodiment of a display device.

FIG. 11 is a block diagram illustrating an embodiment of a self-luminous display device 1000, which may include a display panel 1010 including a plurality of pixels PX, a scan driver 1020 providing scan signals SS to the plurality of pixels PX, a compensation data memory 1030 storing compensation data CMPD, a data driver 1040 providing data signals DS to the plurality of pixels PX, and a controller 1050 controlling an operation of the self-luminous display device 1000. In some embodiments, the self-luminous display device 1000 may include a current control device 1060 to control a panel current IPANEL of the display panel 1010.

The display panel 1010 may include the plurality of pixels PX, and each pixel PX may include a self-luminous element. In some embodiments, the self-luminous element may include an organic light emitting diode (OLED), e.g., the display panel 1010 may be an OLED display panel. In other embodiments, the self-luminous element may include a quantum dot light emitting diode or another type of self-luminous element.

The scan driver 1020 may generate the scan signals SS based on a scan control signal SCTRL from the controller 1050, and may sequentially provide the scan signals SS to the plurality of pixels PX in a predetermined manner, e.g., on a row-by-row basis. In some embodiments, the scan control signal SCTRL may include, but is not limited to, a scan start signal and a scan clock signal. In some embodiments, the scan driver 1020 may be integrated or formed in a peripheral portion of the display panel 1010. In some embodiments, the scan driver 1020 may be implemented with one or more integrated circuits.

The data driver 1040 may generate the data signals DS based on a data control signal DCTRL and corrected image data CDAT received from the controller 1050. The data driver 1040 may provide the data signals DS corresponding to the corrected image data CDAT to the plurality of pixels PX. In some embodiments, the data control signal DCTRL may include, but is not limited to, an output data enable signal, a horizontal start signal and a load signal. In some embodiments, the data driver 1040 and the controller 1050 may be implemented with a single integrated circuit, which, for example, may be referred to as a timing controller embedded data driver (TED). In some embodiments, the data driver 1040 and the controller 1050 may be implemented with separated integrated circuits.

The controller 1050 (e.g., timing controller (TCON)) may receive input image data IDAT and a control signal CTRL from an external host processor (e.g., a graphic processing unit (GPU), an application processor (AP) or a graphic card). In some embodiments, the control signal CTRL may include, but is not limited to, a vertical synchronization signal, a horizontal synchronization signal, an input data enable signal, a master clock signal, etc. The controller 1050 may generate the corrected image data CDAT, the data control signal DCTRL and the scan control signal SCTRL based on the input image data IDAT and the control signal CTRL. The controller 1050 may control operation of the data driver 1040 by providing the corrected image data CDAT and the data control signal DCTRL to the data driver 1040, and may control operation of scan driver 1020 by providing the scan control signal SCTRL to scan driver 1020.

The compensation data memory 1030 may store the compensation data CMPD including a plurality of compensation values at one or more reference gray levels and a maximum reference gray level. In some embodiments, the compensation data CMPD may include the plurality of compensation values at the maximum reference gray level, determined based on a first capture image corresponding to align pattern data to which box data having the maximum reference gray level are added. The compensation data CMPD may also include the plurality of compensation values at the one or more reference gray levels, determined based on one or more second capture images corresponding to one or more full pattern data respectively having the one or more reference gray levels lower than the maximum reference gray level.

The controller 1050 may generate the corrected image data CDAT by correcting the input image data IDAT based on the compensation data CMPD. For example, in a case where the input image data IDAT for a pixel PX represents one gray level among the one or more reference gray levels and the maximum reference gray level, the controller 1050 may generate the corrected image data CDAT for the pixel PX by adding or multiplying the input image data IDAT for the pixel PX and the compensation value of the compensation data CMPD for the pixel PX.

In one example, in a case where the input image data IDAT for a pixel PX represents one gray level between adjacent two reference gray levels among the one or more reference gray levels and the maximum reference gray level, the controller 1050 may calculate a compensation value for the pixel PX by interpolating the compensation values at the adjacent two reference gray levels. In addition, the controller 1050 may generate the corrected image data CDAT for the pixel PX by adding or multiplying the input image data IDAT for the pixel PX and the calculated compensation value for the pixel PX.

The current control device 160 may compare the panel current IPANEL of the display panel 1010 with a reference current, and may control the panel current IPANEL to be lower than or equal to the reference current. For example, the current control device 160 may measure the panel current IPANEL of the display panel 1010, and may provide a current limit signal to the controller 1050 when the panel current IPANEL is higher than the reference current. In an example, the controller 1050 may reduce the panel current IPANEL of the display panel 1010 by decreasing the corrected image data CDAT in response to the current limit signal. In one example, the controller 1050 may reduce the panel current IPANEL of the display panel 1010 by decreasing a power supply voltage provided to the display panel 1010 in response to the current limit signal.

Even if other test devices which have been proposed provide full pattern data having a high gray level (e.g., a 255-gray level) higher than a particular gray level to a self-luminous display device, the self-luminous display device may not display a full pattern image corresponding to the high gray level, but rather may display a full pattern image corresponding to the particular gray level (e.g., a 160-gray level). This is because the current control device in these other test devices imposed a current limit as described herein.

Accordingly, other test devices which have been proposed may not measure or obtain actual luminance of a display panel at a high gray level that is higher than the particular gray level. Thus, these other proposed test devices may generate compensation data based on an inaccurate predicted luminance at the high gray level, not actually measured luminance. This inaccurate compensation data will cause the self-luminous display device to display an image having a mura defect at the high gray level.

However, in accordance with one or more embodiments of the self-luminous display device 1000, the compensation data memory 1030 may store compensation data CMPD, which includes both: (1) a plurality of compensation values at the one or more reference gray levels determined using the one or more full pattern data respectively having one or more reference gray levels lower than the maximum reference gray level and (2) a plurality of compensation values at the maximum reference gray level which are determined using the align pattern data to which the box data having the maximum reference gray level are added. Accordingly, the self-luminous display device 1000 may display an image where a mura defect is eliminated or reduced, which may improve image quality of the self-luminous display device 1000.

Figure 12:
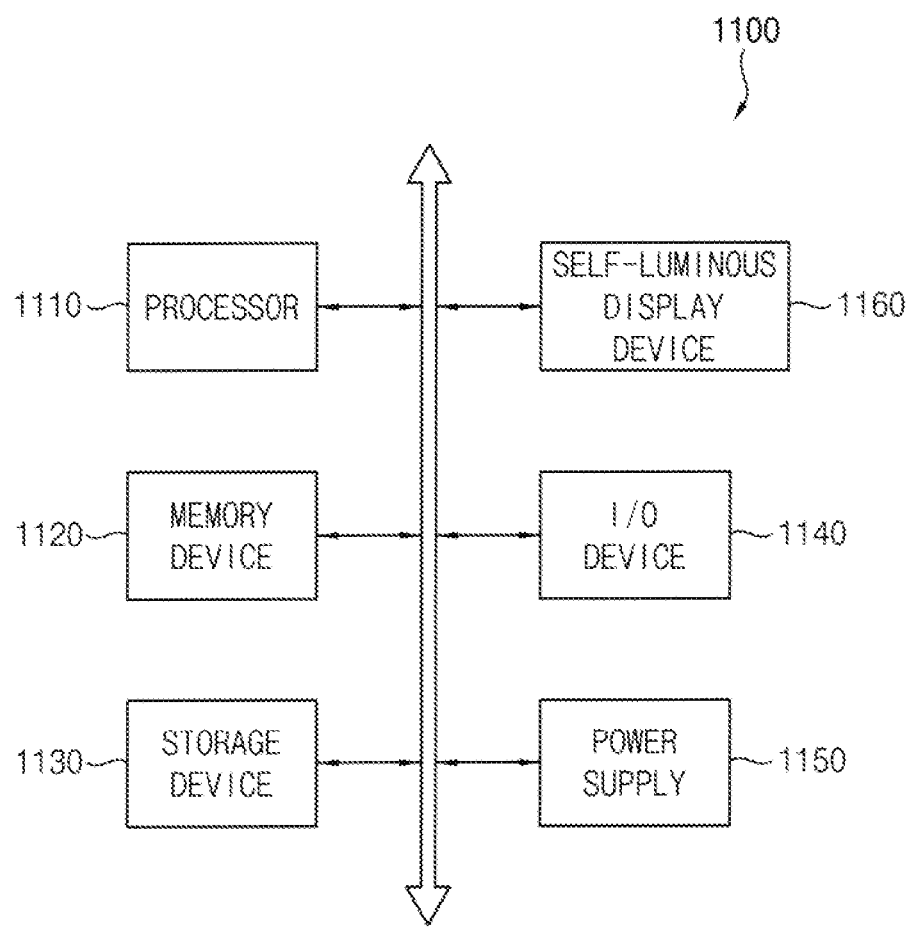
FIG. 12 illustrates an embodiment of an electronic device including a display device.

FIG. 12 is a block diagram illustrating an embodiment of an electronic device 1100 may include a processor 1110, a memory device 1120, a storage device 1130, an input/output (I/O) device 1140, a power supply 1150, and a self-luminous display device 1160. The electronic device 1100 may further include a plurality of ports for communicating, for example, with a video card, a sound card, a memory card, a universal serial bus (USB) device, other electric devices, etc.

The processor 1110 may perform various computing functions or tasks. The processor 1110 may be an application processor (AP), a micro processor, a central processing unit (CPU), or another type of processor or controller. The processor 1110 may be coupled to other components via an address bus, a control bus, a data bus, etc. In some embodiments, the processor 1110 may be further coupled to an extended bus such as a peripheral component interconnection (PCI) bus.

The memory device 1120 may store data for operations of the electronic device 1100. Examples of the memory device 1120 include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, and a mobile dynamic random access memory (mobile DRAM) device.

The storage device 1130 may be a solid state drive (SSD) device, a hard disk drive (HDD) device, a CD-ROM device, or another type of storage device. The I/O device 1140 may be an input device, e.g., a keyboard, a keypad, a mouse, a touch screen, etc, and an output device such as a printer, a speaker, etc. The power supply 1150 may supply power for operations of the electronic device 1100. The self-luminous display device 1160 may be coupled to one or more other components, for example, through the buses or other communication links.

In the self-luminous display device 1160, a compensation data memory may store compensation data including, not only a plurality of compensation values at one or more reference gray levels (which are determined by using one or more full pattern data respectively having the one or more reference gray levels lower than a maximum reference gray level), but also a plurality of compensation values at the maximum reference gray level (which are determined using align pattern data to which box data having the maximum reference gray level are added). Accordingly, the self-luminous display device 1160 may display an image where a mura defect is eliminated or reduced, which, in turn, may improve image quality of the self-luminous display device 1160.

The embodiments of the inventive concepts may be applied to any self-luminous display device and any electronic device including a self-luminous display device.

Examples of the electronic device include, but are not limited to, a television (TV), a digital TV, a 3D TV, a smart phone, a wearable electronic device, a tablet computer, a mobile phone, a personal computer (PC), a home appliance, a laptop computer, a personal digital assistant (PDA), a portable multimedia player (PMP), a digital camera, a music player, a portable game console, and a navigation device.

In accordance with one embodiment, an apparatus includes a non-transitory computer-readable medium and logic. The non-transitory computer-readable medium is configured to store instructions for controlling the logic. When the instructions are executed by the logic, the logic may generate or apply compensation data to correct an image defect in a display device. The computer-readable medium may be any type of storage medium, including but not limited to any type of removable, portable, or embedded volatile or non-volatile storage device. As described in greater detail below, the logic may be a processor, controller, or other signal-generator or signal-processor.

Because the logic generates or applies the compensation data to correct an image defect in the display device, the logic may be located in the display device or the test device of the embodiments described herein. For example, when generating the compensation data, the logic may be included in the test device 100 or the display device 200. When incorporated into the display device 200, the logic may correspond, for example, to the controller 1050 or another processor in the display device. Also, the non-transitory computer-readable medium may correspond to memory 1030 or another memory in the display device. The image defect may be mura defects, non-uniformities, or another type of defect in an image.

The compensation data may include any of the types in accordance with the embodiments described herein. For example, the compensation data may include a plurality of compensation values at a maximum reference gray level, determined based on a first image corresponding to align pattern data to which box data having a maximum reference gray level are added. The compensation data may also include plurality of compensation values at one or more reference gray levels, determined based on one or more second images corresponding to one or more full pattern data respectively having one or more reference gray levels lower than the maximum reference gray level, the first image and the one or more second images captured from the display device.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, modules, generators, logic, interfaces, blocks, decoders, drivers, generators and other signal generating and signal processing features of the embodiments disclosed herein may be implemented, for example, in non-transitory logic that may include hardware, software, or both. When implemented at least partially in hardware, the controllers, processors, devices, modules, generators, logic, interfaces, blocks, decoders, drivers, generators and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, devices, modules, generators, logic, interfaces, blocks, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The foregoing is illustrative of embodiments and is not to be construed as limiting thereof. Although a few embodiments have been described, those skilled in the art will readily appreciate that many modifications are possible in the embodiments without materially departing from the novel teachings of the present inventive concept. Accordingly, such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims. The embodiments may be combined to form additional embodiments.

What is claimed is:

1. A method of generating information to control display of images, the method comprising:
   providing a display device with align pattern data to which box data having a maximum reference gray level is added;
   obtaining a first capture image of the display device generated based on the align pattern data to which the box data is added;
   providing the display device with one or more full pattern data respectively having one or more reference gray levels lower than the maximum reference gray level;
   obtaining one or more second capture images of the display device generated based on the one or more full pattern data; and generating compensation data including a plurality of compensation values at the one or more reference gray levels and the maximum reference gray level, the compensation data generated based on the one or more second capture images and a portion of the first capture image corresponding to the box data, wherein the display device is a self-luminous display device, wherein generating the compensation data includes determining the plurality of compensation values, for a plurality of pixels of a display panel of the display device at the maximum reference gray level, based on a luminance of the portion of the first capture image corresponding to the box data, wherein a compensation value, of the plurality of compensation values, for a first pixel of the plurality of pixels at the maximum reference gray level is determined based on a difference between a luminance of the first capture image for the first pixel at the maximum reference gray level and a luminance of a target gamma curve at the maximum reference gray level.

2. The method of claim 1, wherein the box data corresponds to one white box image at a substantially center position of the display panel of the display device.

3. The method of claim 1, further comprising:
aligning a position of the display panel of the display device and positions of the one or more second capture images based on the first capture image.

4. The method of claim 1, wherein:
the display device displays a total range of gray levels from a 0-gray level to a 255-gray level, and
the maximum reference gray level is the 255-gray level.

5. The method of claim 1, wherein the box data corresponds to a plurality of white box images at a plurality of positions of the display panel of the display device.

6. The method of claim 5, wherein the plurality of white box images is one of 3*3 white box images, 5*5 white box images, 7*7 white box images, or 9*9 white box images.

7. The method of claim 1, wherein the align pattern data includes dot pattern data which corresponds to an image that includes a black background and one white dot per M*M pixels in the black background, where M is an integer greater than 1.

8. The method of claim 1, wherein generating the compensation data further includes:
determining the plurality of compensation values, for the plurality of pixels of the display panel of the display device at the one or more reference gray levels, based on luminances of the one or more second capture images.

9. The method of claim 1, further comprising:
wilting the compensation data, including the plurality of compensation values at the one or more reference gray levels and the maximum reference gray level, to the display device.

10. A test device, comprising:
first logic configured to provide a display device with test data, the test data including align pattern data and one or more full pattern data, the align pattern data including added box data having a maximum reference gray level, and the one or more full pattern data respectively having one or more reference gray levels lower than the maximum reference gray level;
a camera configured to obtain a first capture image and one or more second capture images of the display device, the first capture image generated based on the align pattern data including the added box data and the one or more second capture images generated based on the one or more full pattern data; and
second logic configured to generate compensation data including a plurality of compensation values at the one or more reference gray levels and the maximum reference gray level, the plurality of compensation values generated based on the one or more second capture images and a portion of the first capture image corresponding to the box data, wherein the display device is a self-luminous display device, wherein the second logic is further configured to determine the plurality of compensation values, for a plurality of pixels of a display panel of the display device at the maximum reference gray level, based on a luminance of the portion of the first capture image corresponding to box data, wherein a compensation value, of the plurality of compensation values, for a first pixel of the plurality of pixels at the maximum reference gray level is determined based on a difference between a luminance of the first capture image for the first pixel at the maximum reference gray level and a luminance of a target gamma curve at the maximum reference gray level.

11. The test device of claim 10, wherein the box data corresponds to one white box image at a substantially center position of the display panel of the display device.

12. The test device of claim 10, wherein the second logic is configured to align a position of the display panel of the display device and positions of the one or more second capture images based on the first capture image.

13. The test device of claim 10, wherein:
the display device displays a total range of gray levels from a 0-gray level to a 255-gray level, and
the maximum reference gray level is the 255-gray level.

14. The test device of claim 10, wherein the box data corresponds to a plurality of white box images at a plurality of positions of the display panel of the display device.

15. The test device of claim 14, wherein the plurality of white box images is one of 3*3 white box images, 5*5 white box images, 7*7 white box images, or 9*9 white box images.

16. The test device of claim 10, wherein the align pattern data include dot pattern data corresponding to an image which includes a black background and one white dot per M*M pixels in the black background, where M is an integer greater than 1.

17. The test device of claim 10, wherein the second logic is configured to:
determine the plurality of compensation values, for the plurality of pixels of the display panel of the display device at the one or more reference gray levels, based on luminances of the one or more second capture images.

18. The test device of claim 10, wherein the compensation data including the plurality of compensation values at the one or more reference gray levels and the maximum reference gray level are written to the self-luminous display device.

19. A display device, comprising:
a display panel including a plurality of pixels, each of the plurality of pixels including a self-luminous light emitter;
a scan driver configured to provide scan signals to the plurality of pixels;
a memory configured to store compensation data;
a controller configured to generate corrected image data by correcting input image data based on the compensation data; and a data driver configured to provide data signals to the plurality of pixels based on the corrected image data, wherein the compensation data includes:

a plurality of compensation values at a maximum reference gray level, determined based on a first capture image corresponding to align pattern data to which box data having a maximum reference gray level added, wherein the compensation values at the maximum reference gray level, for the plurality of pixels at the maximum reference gray level, is determined based on a luminance of a portion of the first capture image corresponding to the box data, wherein a compensation value, of the plurality of compensation values for a first pixel of the plurality of pixels at the maximum reference gray level is determined based on a difference between a luminance of the first capture image for the first pixel at the maximum reference gray level and a luminance of a target gamma curve at the maximum reference gray level; and a plurality of compensation values at one or more reference gray levels, determined based on one or more second capture images corresponding to one or more full pattern data respectively having one or more reference gray levels lower than the maximum reference gray level.

20. The self-luminous display device of claim 19, further comprising:

a current controller configured to compare a panel current of the display panel with a reference current, and to control the panel current to be lower than or equal to the reference current.

\* \* \* \* \*